United States Patent [19]

Iwahashi

[11] Patent Number: 5,007,596
[45] Date of Patent: Apr. 16, 1991

[54] TAPE CASSETTE REEL HAVING AN UPPER REEL MOLDED BY DICHROMATIC MOLDING PROCESS

[75] Inventor: Yuji Iwahashi, Miyagi, Japan

[73] Assignee: Sony Corporation, Tokyo, Japan

[21] Appl. No.: 452,203

[22] Filed: Dec. 18, 1989

[30] Foreign Application Priority Data

Dec. 29, 1988 [JP] Japan .................. 63-331502

[51] Int. Cl.⁵ .............................. B65H 75/14
[52] U.S. Cl. ................................ 242/71.800
[58] Field of Search ............ 242/71.8, 197, 198, 242/199, 200

[56] References Cited

U.S. PATENT DOCUMENTS

| | | | |
|---|---|---|---|
| 4,403,749 | 9/1983 | Nakagawa | 242/71.8 |
| 4,606,511 | 8/1986 | Machida | 242/71.8 |
| 4,807,826 | 2/1989 | Iwahashi | 242/71.8 |
| 4,846,419 | 7/1989 | Tateno et al. | 242/71.8 |
| 4,930,714 | 6/1990 | Hashizume | 242/71.8 |

*Primary Examiner*—John M. Jillions
*Attorney, Agent, or Firm*—Philip M. Shaw, Jr.

[57] ABSTRACT

A tape cassette reel of the type having an opaque, upper flange portion which is bonded to an outer peripheral flange portion and to an integrally formed lower flange portion and reel hub, wherein a shock-absorbing rib portion is formed on a radially inner surface of the outer peripheral flange portion so as to oppose an end face of the reel hub, and a pouring gate mark is formed on the radially inner side of the shock-absorbing rib portion during molding of the outer peripheral flange portion.

4 Claims, 3 Drawing Sheets

TAPE CASSETTE REEL HAVING AN UPPER REEL MOLDED BY DICHROMATIC MOLDING PROCESS

BACKGROUND OF THE INVENTION

1. Field of the Invention

The present invention relates generally to tape cassette reels and more particularly to a tape cassette reel having wound therearound a magnetic tape and which is incorporated in a video tape cassette.

2. Description of the Prior Art

In order to gain a better understanding of the present invention, let us first explain a known tape cassette reel with reference to FIGS. 1 and 2 (see Japanese Patent Published Gazette No. 63-184979 and corresponding U.S. application Ser. No. 145,391). This previously-proposed tape cassette reel has a magnetic tape wound therearound and is incorporated in a video tape cassette.

Referring to a perspective view forming FIG. 1 and a side view of a section forming FIG. 2, it will be seen that a tape cassette reel TR is comprised of a reel hub 1 formed as one body with a lower flange portion 2 and an upper flange portion 5 secured to the upper end face of the reel hub 1. The upper flange portion 5 is comprised of a central portion 3 made of an opaque material of a desired color and an outer peripheral flange portion 4 made of a transparent, synthetic resin such as acrylonitrile butadiene styrene copolymer (ABS) resin, so-called SAN resin and the like according to the so-called dichromatic molding method.

The outer surface of the colored central portion 3 of the upper flange portion 5 is made lower, as viewed in the figure, than the outer peripheral flange portion 4 by a very small amount. An aperture 6 is formed through the central portion 3 of the flange portion 5 at its central portion, and a center pin 7 is loosely supported between the central, lower surface 3 of the upper flange portion 5 and the central, upper end face of the reel hub 1. The center pin 7 comes in contact with cassette reel pushing springs S provided in a cassette housing C shown in FIG. 3. Upon molding, a pouring gate mark g is formed between the aperture 6 and the outer peripheral flange portion 4. Protruding portions 4a, 4a are formed on the inner peripheral side of the transparent, outer peripheral flange portion 4 of the upper flange portion 5 so as to protrude in the radially central direction of the colored central portion 3. Two pouring gate mark g are also formed on the outer surfaces of these protruding portions 4a, 4a, and these pouring gate mark g are formed in the molding-process for molding the transparent, outer peripheral flange portion 4.

As shown in FIG. 2, a hub drive shaft engaging aperture 9 is formed on the lower surface side of the reel hub 1 so that it can be engaged with a hub drive shaft of a video tape recorder body (not shown). As shown in FIG. 1, a clamp piece engaging portion 8 is formed around the peripheral surface of the reel hub 1. The clamp piece engaging portion 8 is used to fix the end of a video tape (not shown) thereto together with a clamp piece (not shown). Reel brake engaging teeth 2a are formed around the outer peripheral surface of the lower flange portion 2. Then, the upper flange portion 5 is welded at the lower surface of the colored central portion 3 thereof to the upper end face of the reel hub 1 by an ultrasonic welding-process, thereby completing the tape cassette reel.

In the above-mentioned tape cassette reel according to the prior art, the protruding portions are formed on the inner peripheral side of the outer peripheral flange portion so as to protrude toward the inside of the colored central portion, and the pouring gate mark are formed on the outer surfaces of the protruding portions. Thus, when the outer peripheral flange portion of the upper flange is molded by a molding-process, resin flows from the protruding portions to the inner peripheral portion of the upper flange portion and then spreads to the outer peripheral side in a two-stage fashion, degrading the efficiency of the resin flow.

After the molding-process, the marks of the pouring gates remain on the outer surfaces of the protruding portions of the outer peripheral flange portion which is protrusively molded with the colored central portion, deteriorating the quality of the external appearance of the tape cassette reel. If the tape cassette reel is very small, just like a tape cassette reel for a tape cassette of 8 mm video tape recorder, the marks of the pouring gates become very conspicuous so that the users feel as if they had bought an inferior product.

OBJECT AND SUMMARY OF THE INVENTION

Accordingly, it is an object of the present invention to provide an improved tape cassette reel which can eliminate the above-mentioned defects encountered with the prior art.

More specifically, it is an object of the present invention to provide a tape cassette reel of a simplified design in which a resin can be flowed smoothly in the molding-process of an upper flange portion.

It is another object of the present invention to provide a tape cassette reel of a simplified design in which the marks of pouring gates at the completion of the molding-process can be completely hidden from the outside.

It is still another object of the present invention to provide a tape cassette reel whose external appearance is excellent.

It is a further object of the present invention to provide a tape cassette reel in which an upper flange portion can be stably and positively secured to an upper end face of a reel hub.

It is a yet further object of the present invention to provide a tape cassette reel whose quality can be increased.

According to an aspect of the present invention, there is provided a tape cassette reel comprising:

(a) an upper flange portion having an opaque central portion, an outer peripheral flange portion and a bonding surface between them; and (b) an integrally formed lower flange portion and reel hub, the upper flange portion being bonded to the reel hub, wherein a shock-absorbing rib portion is formed radially interior of the hub on an inner peripheral side surface of the outer peripheral flange portion so as to oppose an end face of the reel hub, and a pouring gate mark is formed on the side of the shock-absorbing rib portion which is interior of the hub in order during the molding of the outer peripheral flange portion.

The above, and other objects, features and advantages of the present invention, will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Figure 1:
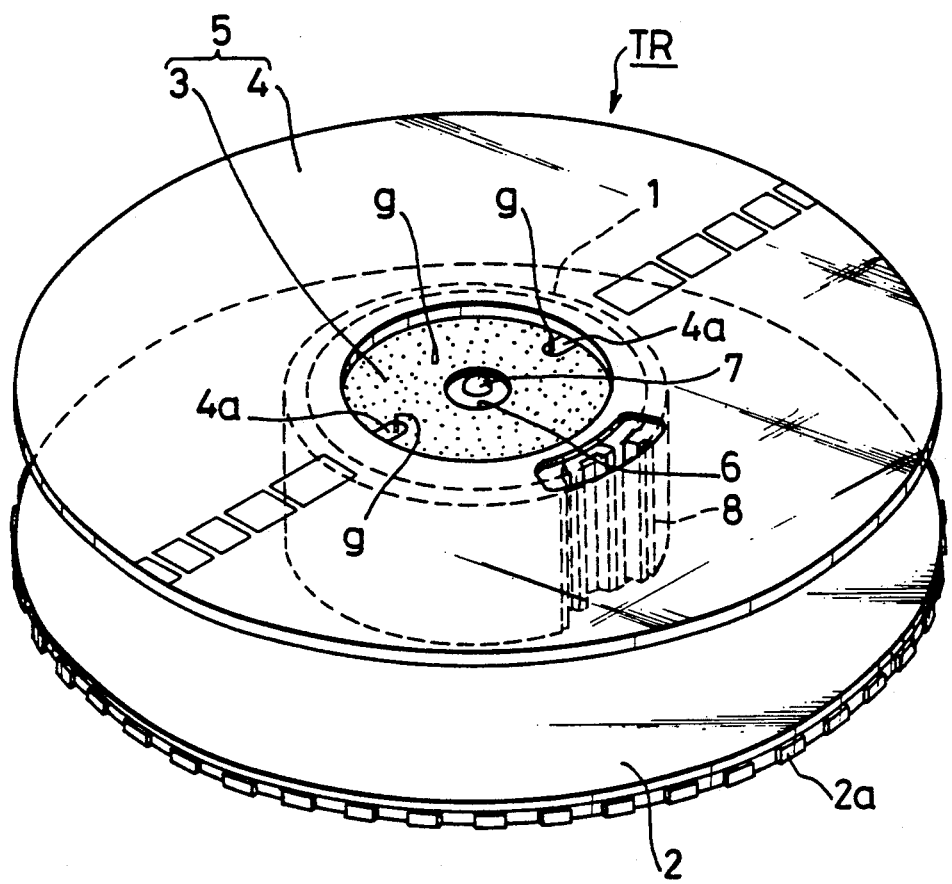
FIG. 1 is an enlarged perspective view illustrating a prior-art tape cassette reel.
Figure 2:
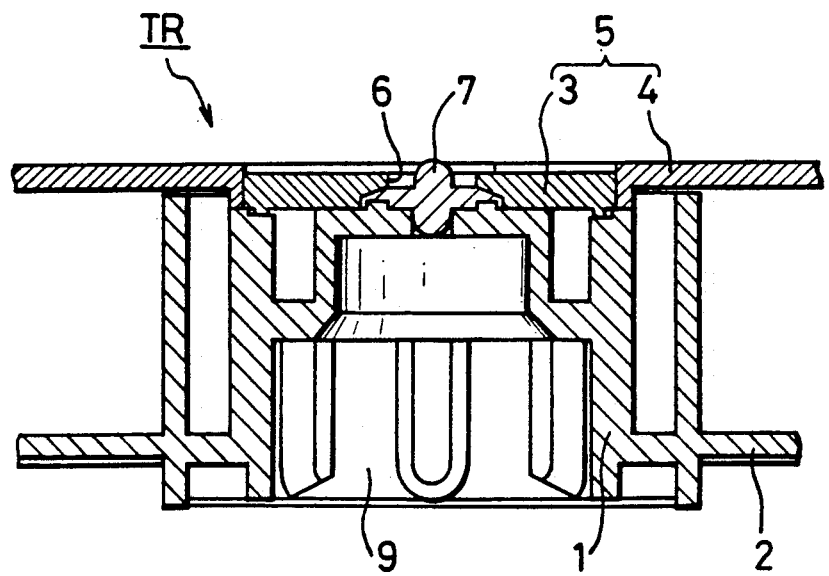
FIG. 2 is a fragmentary, sectional side view illustrating a central portion of the tape cassette reel shown in FIG. 1.
Figure 3:
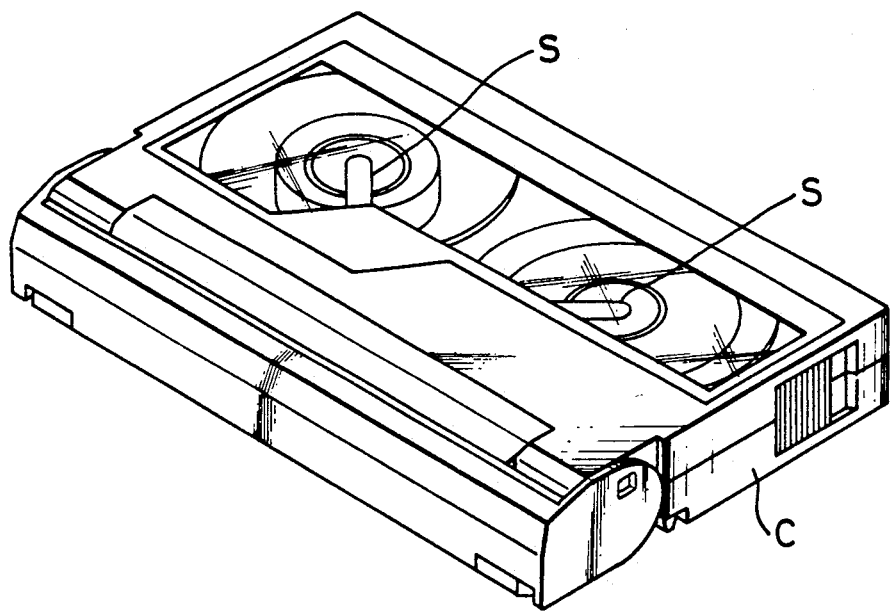
FIG. 3 is a perspective view illustrating an example of a prior-art video tape cassette.

The present invention will now be described in detail with reference to FIGS. 4 to 6. In this embodiment, the tape cassette reel of the invention is for use in a video tape cassette similarly to the example of the prior art shown in FIG. 3. Throughout FIGS. 4 to 6, like parts corresponding to those of FIGS. 1 to 3 are marked with the same references and therefore need not be described in detail.

Figure 4:
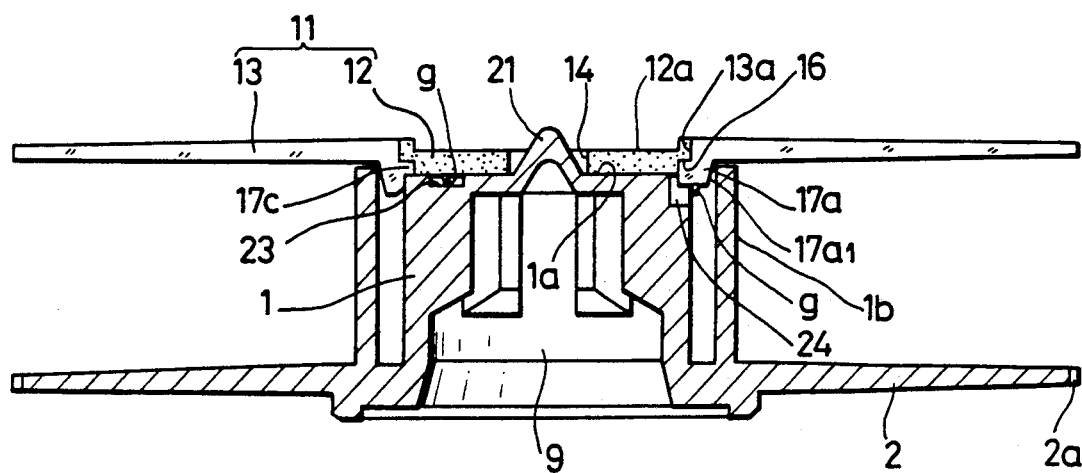
FIG. 4 is a sectional side view illustrating a main portion of a tape cassette reel according to an embodiment of the present invention.
Figure 5:
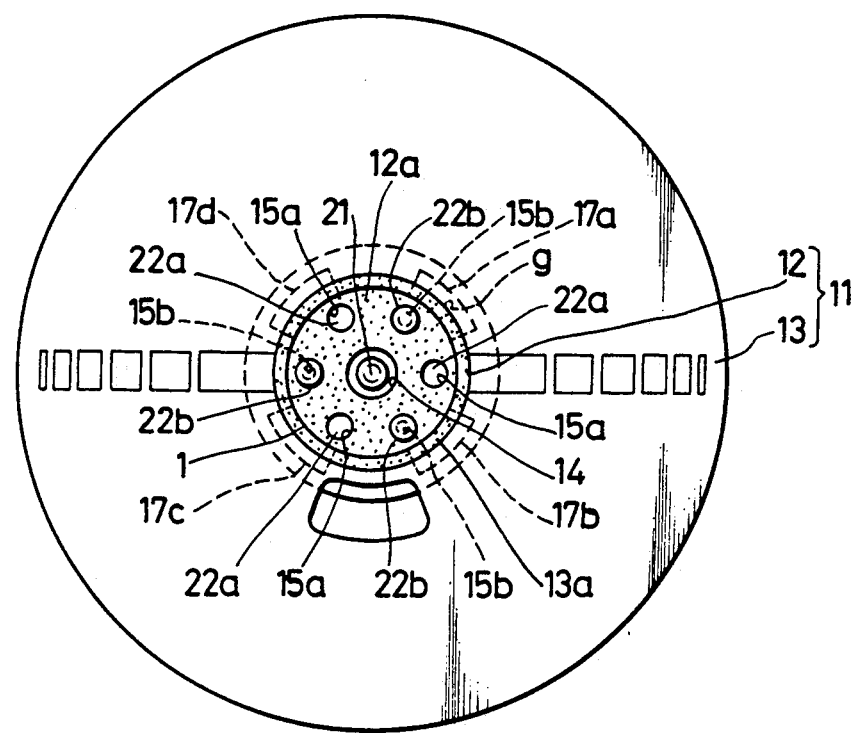
FIG. 5 is a plan view of the tape cassette reel of the invention shown in FIG. 4.
Figure 6:
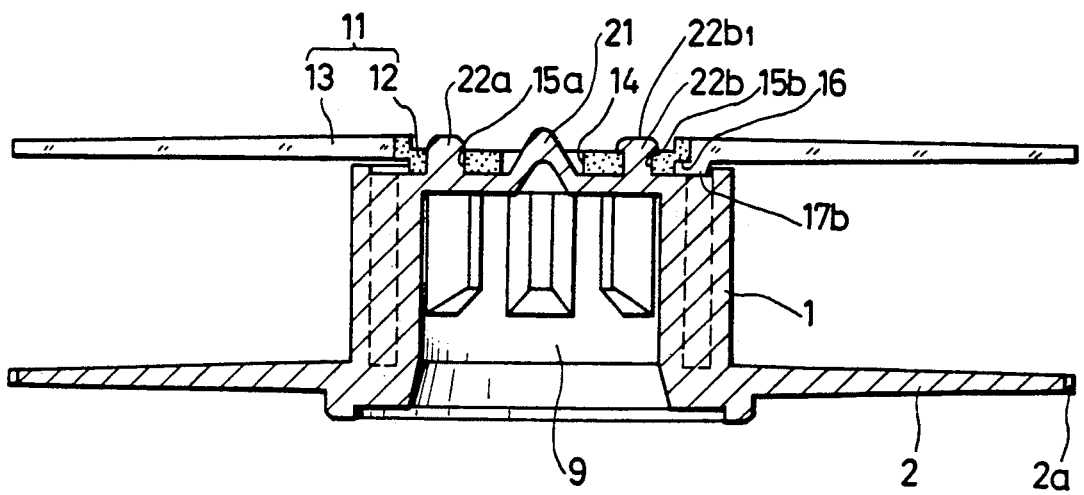
FIG. 6 is a sectional side view illustrating other portions of the tape cassette reel according to the present invention.

Also in this embodiment, as shown in FIGS. 4 to 6, the lower flange portion 2 is formed as one body with the reel hub 1, and an upper flange 11 is bonded to the upper end face 1a of the reel hub 1. The reel hub 1 is made of a synthetic resin of a light color such as white and so on. Also in this embodiment, the upper flange portion 11 is comprised of a central portion 12 made of an opaque, synthetic resin of a desired color such as black, and an outer peripheral flange portion 13 made of a transparent resin by the dichromatic molding-process. The peripheral portion 13 has substantially the same diameter as the lower flange portion 2.

The central portion 12 of the upper flange portion 11 has a diameter smaller than that of the reel hub 1 by a very small amount, and the upper surface side of the central portion 12 is concaved except for its peripheral edge portion to provide a concaved surface 12a. An aperture 14 is formed through the central portion of the concaved surface 12a. A plurality of through-holes, for example, six large and small through-holes 15a and 15b, respectively, are alternately formed through the concaved surface 12a and around the aperture 14 with predetermined spacings, and a step 16 is formed on the radially inner surface of the peripheral side surface of the central portion 12. The pouring gate mark g for the central portion 12 is formed on its surface which faces the hub 1 so as to mold the central portion 12.

A plurality of shock-absorbing rib portions 17, for example, four shock-absorbing rib portions 17a, 17b, 17c and 17d, having a predetermined spacing therebetween, are formed on the lower side, as viewed in FIG. 4, of the inner peripheral edge 13a of the peripheral portion 13. The shock absorbing rib portions 17a, 17b, 17c and 17d are radially exterior of the central hub 1 but radially interior of an outer cylindrical hub extension 1b that is coaxial with the hub 1. The radially inner peripheral edge 13a of the outer flange portion 13 is bonded to the central portion 12, and these shock-absorbing rib portions 17a, 17b, 17c and 17d are outwardly meshed with the step 16 formed around the peripheral side surface of the central portion 12.

Of the shock-absorbing rib portions 17a, 17b, 17c and 17d, the rib portion 17a is inwardly elongated to form an elongated portion $17_{a1}$, and the pouring gate mark g is formed on the lower surface side of the elongated portion $17_{a1}$, as viewed in FIG. 4, to be between the radially outer surface of the hub 1 and the radially inner surface of the hub extension 1b.

The thus constructed central portion 12 and the thus constructed outer peripheral flange portion 13 are integrally molded as one body by the dichromatic molding method as described previously. In other words, the peripheral side surface of the central portion 12 and the inner peripheral edge 13a of the outer peripheral flange portion 13 are integrally molded as one body and the step 16 and the rib portions 17a, 17b, 17c and 17d are integrally molded as one body, thereby forming the upper flange portion 11.

A protrusion 21 is integrally formed in the reel hub 1 at the central portion of the upper end face 1a, and this protrusion 21 corresponds to the center pin 7 of the prior-art example. Large and small protrusions 22a, 22b, respectively, are formed on the upper end face 1a around the protrusion 21 so as to correspond to the through-holes 15a, 15b formed through the central portion 12 of the upper flange portion 11.

A concaved portion 23 is formed on the upper end face 1a of the reel hub 1, and this concaved portion 23 accommodates the pouring gate mark g of the central portion 12 of the upper flange portion 11. Further, a notch 24 is formed in the peripheral edge of the upper end face 1a, and this notch 24 opposes the elongated portion $17_{a1}$ of the shock-absorbing rib portion 17a of the outer peripheral flange portion 13.

The bonding of the upper flange portion 11 on the upper end face 1a of the thus arranged reel hub 1 will now be described. Placing the central portion 12 of the upper flange portion 11 opposed to the upper end face 1a of the reel hub 1, the protrusions 22 are inserted into the through-holes 15. That is, the large protrusions 22a are inserted into and engaged with the large apertures 15a, and the small protrusions 22b are inserted into and engaged with the small apertures 15b. In this state, the top of the protrusion 21 of the reel hub 1 protrudes upwards from the central aperture 14 of the central portion, and the pouring gate mark g, i.e. the pouring gate mark of the central portion 12, is opposed to the concaved portion 23 of the reel hub 1. Also, the elongated portion $17_{a1}$ of the shock-absorbing rib portion 17a of the outer peripheral flange portion 13 and the pouring gate mark g, are opposed to and inserted into the concaved portion 24. Thus, the inner surface of the central portion 12 can be stably ultrasonically bonded to the upper end face 1a of the reel hub 1 without wobble.

The small apertures 15b of the central portion 12 are welded at the tops thereof and caulked, thereby securing the upper flange portion 11 to the reel hub 1. In this case, as shown in FIG. 6, in order to properly caulk the top of the small protrusion 22b, the diameter of a caulking portion $22_{b1}$ of the small protrusion 22b is selected to be the same as that of the large protrusion 22a protruding upward from the large aperture 15a.

In the thus arranged tape cassette reel, the pouring gate mark g used to mold the outer peripheral flange portion 13 is provided on the inner surface edge portion so that during molding the resin smoothly flows and spreads to the outer periphery side, thereby positively molding the outer peripheral flange portion 13 of the upper flange portion 11. Further, the pouring gate mark is located at the inner surface side of the elongated portion 17$_{a1}$ of the shock-absorbing rib portion 17 and is hidden by the opaque central portion 12. Therefore, the pouring gate mark of the outer peripheral flange portion 13 can not be seen from the outer surface side and the external appearance of the tape cassette reel of the invention can be improved in quality.

The shock-absorbing rib portions 17 are held between the central portion 12 and the upper end face 1a of the reel hub 1 with pressure so that, even when the outer peripheral flange portion 13 is shocked considerably, the outer peripheral flange portion 13 can be prevented from being disengaged from the reel hub 1. In other words, the upper flange portion 11 can be prevented from being damaged.

Further, since the pouring gate mark of the central portion 12 is located on its inner surface side, the pouring gate mark of the central portion 12 is also hidden by the opaque central portion 12 and can not be seen from the outside, thereby further improving the external appearance of the tape cassette reel in quality.

The color of the central portion of the upper flange portion is not limited to black and can be changed to various colors such as silver and the like in accordance with the design of the video tape cassette. Furthermore, the positions at which the shock-absorbing rib portions are provided on the outer peripheral flange portion and the positions at which the pouring gates are formed can be changed freely.

According to the present invention, as set forth above, the upper flange portion can be efficiently molded, whereby the tape cassette reel can be manufactured at high efficiency. Further, the pouring gate marks for the upper flange portion are completely hidden from the outside, which fact can increase the external appearance of the tape cassette reel in quality.

Furthermore, according to the present invention, as set out above, the pouring gate mark of the upper flange portion is completely hidden from the outside, and the concaved portion corresponding to the pouring gate mark of the upper flange portion is formed on the surface of the upper flange portion which is secured to the reel hub. Thus, when the upper flange portion is secured to the upper end face of the reel hub, the pouring gate mark is inserted into the concaved portion, whereby the upper flange portion can be stably secured to the upper end face of the reel hub without wobble. Therefore, it is possible to provide a tape cassette reel whose external appearance is excellent and whose quality is excellent.

Having described a preferred embodiment of the invention in detail with reference to the accompanying drawings, it is to be understood that the present invention is not limited to that precise embodiment and that many changes and modifications can be effected by one skilled in the art without departing from the spirit and scope of the invention as defined in the appended claims.

I claim as my invention:

1. A tape cassette reel comprising:
   (a) an integrally formed lower flange portion and reel hub, the reel hub having an end face, and
   (b) an upper flange portion having an opaque central portion, an outer peripheral flange portion and a bonding surface between them, the upper flange portion being bonded to the reel hub, and wherein a shock-absorbing rib portion is formed at a radially inner peripheral side surface of the outer peripheral flange portion so as to abut the end face of the reel hub, and a pouring gate mark is formed on the radially inner surface side of the shock-absorbing rib portion during molding of the outer peripheral flange portion.

2. A tape cassette reel according to claim 1, wherein the opaque central portion and the outer peripheral flange portion are made by a dichromatic molding process.

3. A tape cassette reel according to claim 1, wherein a pouring gate mark is further formed on the surface of the central portion which is opposed to the hub during the molding of the central portion of the upper flange portion.

4. A tape cassette reel according to claim 3, wherein notches are formed on the surface of the hub at the point where the upper flange portion is bonded to the reel hub, the notches being located at positions opposite to the pouring gate marks.

* * * * *